United States Patent
Davis, Jr. et al.

(10) Patent No.: US 9,856,768 B2
(45) Date of Patent: Jan. 2, 2018

(54) POWER GENERATION SYSTEM EXHAUST COOLING

(71) Applicant: General Electric Company, Schenectady, NY (US)

(72) Inventors: Lewis Berkley Davis, Jr., Niskayuna, NY (US); Gilbert Otto Kraemer, Greer, SC (US); Parag Prakash Kulkarni, Niskayuna, NY (US); Hua Zhang, Greer, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 14/753,064

(22) Filed: Jun. 29, 2015

(65) Prior Publication Data

US 2016/0376954 A1     Dec. 29, 2016

(51) Int. Cl.
    *F01D 15/10*     (2006.01)
    *F01N 3/04*      (2006.01)
    (Continued)

(52) U.S. Cl.
    CPC .............. *F01N 3/04* (2013.01); *F01D 15/10* (2013.01); *F01D 25/305* (2013.01); *F01N 3/103* (2013.01); *F01N 3/2066* (2013.01); *F02C 3/04* (2013.01); *F02C 3/30* (2013.01); *F02C 7/141* (2013.01); *F02C 7/16* (2013.01); *F01N 2590/10* (2013.01);
    (Continued)

(58) Field of Classification Search
    CPC .......... F01N 3/04; F01N 3/103; F01N 3/2066; F01N 2590/10; F01N 2610/02; F01N 2610/08; F02C 3/04; F02C 7/141; F02C 7/16; F02C 3/30; F01D 15/10; F01D 25/305; F05D 2220/32; F05D 2220/76; F05D 2240/24; F05D 2240/35;
    (Continued)

(56) References Cited

U.S. PATENT DOCUMENTS 3,968,647 A   7/1976 Boudigues
3,998,047 A  12/1976 Walker
(Continued)

FOREIGN PATENT DOCUMENTS

CH       679236 A5    1/1992
EP     1 643 113 A2   4/2006
(Continued)

OTHER PUBLICATIONS

Michael J. Reale, "New High Efficiency Simple Cycle Gas Turbine," General Electric Company, 2004, 20 pages. http://site.ge-energy.com/prod_serv/products/tech_docs/en/downloads/ger4222a.pdf.
(Continued)

Primary Examiner — Brandon Lee
(74) Attorney, Agent, or Firm — Ernest G. Cusick; Hoffman Warnick LLC

(57) ABSTRACT

A turbomachine system according to an embodiment includes: a gas turbine system including a compressor component, a combustor component, and a turbine component; a mixing area for receiving an exhaust gas stream produced by the gas turbine system; a fluid injection system for injecting a fluid into the mixing area to reduce a temperature of the exhaust gas stream; and an exhaust processing system for processing the reduced temperature exhaust gas stream.

5 Claims, 6 Drawing Sheets

(51) Int. Cl.

| | | |
|---|---|---|
| F01N 3/10 | (2006.01) | |
| F01N 3/20 | (2006.01) | |
| F02C 3/04 | (2006.01) | |
| F02C 7/141 | (2006.01) | |
| F02C 7/16 | (2006.01) | |
| F01D 25/30 | (2006.01) | |
| F02C 3/30 | (2006.01) | |

(52) U.S. Cl.
CPC ...... *F01N 2610/02* (2013.01); *F01N 2610/08* (2013.01); *F05D 2220/32* (2013.01); *F05D 2220/76* (2013.01); *F05D 2240/24* (2013.01); *F05D 2240/35* (2013.01); *F05D 2240/60* (2013.01); *F05D 2260/212* (2013.01); *F05D 2270/082* (2013.01); *Y02T 10/24* (2013.01)

(58) Field of Classification Search
CPC ........... F05D 2240/60; F05D 2260/212; F05D 2270/082; Y02T 10/24
See application file for complete search history.

(56) References Cited

U.S. PATENT DOCUMENTS

| | | | |
|---|---|---|---|
| 4,069,661 A | | 1/1978 | Rundell et al. |
| 4,131,432 A | | 12/1978 | Sato et al. |
| 4,165,609 A | | 8/1979 | Rudolph |
| 4,183,210 A | | 1/1980 | Snell |
| 4,292,008 A | | 9/1981 | Grosjean et al. |
| 4,875,436 A | | 10/1989 | Smith et al. |
| 4,961,312 A | | 10/1990 | Simmons |
| 4,982,564 A | | 1/1991 | Hines |
| 5,014,508 A | | 5/1991 | Lifka |
| 5,255,505 A | | 10/1993 | Cloyd et al. |
| 5,473,898 A | * | 12/1995 | Briesch .................. F01K 23/10 60/39.182 |
| 6,161,768 A | | 12/2000 | Gordon et al. |
| 6,250,061 B1 | | 6/2001 | Orlando |
| 6,612,114 B1 | | 9/2003 | Klingels |
| 6,786,034 B2 | | 9/2004 | Liebig et al. |
| 7,493,769 B2 | | 2/2009 | Jangili |
| 7,622,094 B2 | | 11/2009 | Lewis et al. |
| 7,966,825 B2 | | 6/2011 | Judd |
| 8,015,826 B2 | | 9/2011 | Myers et al. |
| 8,186,152 B2 | | 5/2012 | Zhang et al. |
| 8,261,528 B2 | | 9/2012 | Chillar et al. |
| 8,549,833 B2 | | 10/2013 | Hyde et al. |
| 9,255,507 B2 | * | 2/2016 | Forwerck .................. F01N 3/20 |
| 2002/0124568 A1 | * | 9/2002 | Mikkelsen .......... B01D 53/9404 60/685 |
| 2003/0182944 A1 | | 10/2003 | Hoffman et al. |
| 2005/0150229 A1 | | 7/2005 | Baer et al. |
| 2005/0235649 A1 | | 10/2005 | Baer et al. |
| 2007/0101696 A1 | | 5/2007 | Dooley |
| 2007/0130952 A1 | | 6/2007 | Copen |
| 2008/0253881 A1 | | 10/2008 | Richards |
| 2010/0024379 A1 | * | 2/2010 | Sengar ................ B01D 53/8631 60/39.5 |
| 2010/0064655 A1 | | 3/2010 | Zhang et al. |
| 2010/0107600 A1 | | 5/2010 | Hillel et al. |
| 2010/0215558 A1 | * | 8/2010 | Kraemer ............ B01D 53/8656 423/239.1 |
| 2011/0030331 A1 | | 2/2011 | Tong et al. |
| 2011/0036066 A1 | | 2/2011 | Zhang et al. |
| 2011/0067385 A1 | * | 3/2011 | Hi Rata ............. B01D 53/9409 60/287 |
| 2011/0138771 A1 | | 6/2011 | Feller et al. |
| 2011/0158876 A1 | | 6/2011 | Buzanowski et al. |
| 2012/0171020 A1 | | 7/2012 | Peck et al. |
| 2013/0005237 A1 | | 1/2013 | Baten et al. |
| 2013/0031894 A1 | | 2/2013 | Hodgson et al. |
| 2013/0031910 A1 | | 2/2013 | Merchant et al. |
| 2013/0125557 A1 | | 5/2013 | Scipio et al. |
| 2013/0318941 A1 | | 12/2013 | Ekanayake et al. |
| 2013/0318965 A1 | | 12/2013 | Ekanayake et al. |
| 2013/0318984 A1 | | 12/2013 | Ekanayake et al. |
| 2013/0318987 A1 | | 12/2013 | Ekanayake et al. |
| 2013/0318997 A1 | | 12/2013 | Conchieri et al. |
| 2014/0090354 A1 | | 4/2014 | Scipio et al. |
| 2014/0150447 A1 | | 6/2014 | Ekanayake et al. |
| 2014/0208765 A1 | | 7/2014 | Ekanayake et al. |
| 2014/0230433 A1 | | 8/2014 | Yacoub |
| 2014/0230444 A1 | | 8/2014 | Hao et al. |
| 2014/0234073 A1 | | 8/2014 | Moreton et al. |
| 2015/0047359 A1 | | 2/2015 | Maguire et al. |
| 2015/0089955 A1 | | 4/2015 | Knapp et al. |
| 2015/0143811 A1 | | 5/2015 | Pang et al. |
| 2015/0252683 A1 | | 9/2015 | Hasting et al. |
| 2016/0169119 A1 | | 6/2016 | Musci et al. |
| 2016/0201605 A1 | | 7/2016 | Brandstein et al. |
| 2016/0348560 A1 | | 12/2016 | Sato et al. |
| 2016/0376959 A1 | | 12/2016 | Davis, Jr. et al. |

FOREIGN PATENT DOCUMENTS

| | | |
|---|---|---|
| EP | 2 223 733 A1 | 9/2010 |
| EP | 2 615 265 A2 | 7/2013 |
| EP | 3 070 301 A1 | 9/2016 |
| GB | 774425 A | 5/1957 |
| JP | 2013124555 A | 6/2013 |
| WO | 2012/092215 A1 | 7/2012 |

OTHER PUBLICATIONS

Chupka, Marc; "Independent Evaluation of SCR Systems for Frame-Type Combustion Turbines"; The Brattle Group; Anthony Licata, Licata Energy & Environmental Consulting, Inc.; Report for ICAP Demand Curve Reset; Prepared for New York Independent System Operator, Inc.; Nov. 1, 2013; 42 Pages.

Licata A., et al., "Viability of SCR on Simple Cycle Frame Gas Turbines," Licata Energy & Environmental Consultants, Inc., Yonkers, NY, Power Gen. 2014, Dec. 9-11, 2014, pp. 1-13.

"Turbofan," From Wikipedia, the free encyclopedia, Retrieved from the Internet URL: http://en.wikipedia.org/wiki/Turbofan, on Jan. 3, 2017, pp. 1-21.

Extended European Search Report and Opinion issued in connection with related EP Application No. 16176400.6 dated Nov. 14, 2016.

Extended European Search Report and Opinion issued in connection with related EP Application No. 16176128.3 dated Nov. 15, 2016.

Extended European Search Report and Opinion issued in connection with related EP Application No. 16175821.4 dated Nov. 16, 2016.

Extended European Search Report and Opinion issued in connection with related EP Application No. 16175335.5 dated Nov. 25, 2016.

Extended European Search Report and Opinion issued in connection with corresponding EP Application No. 16176515.1 dated Nov. 28, 2016.

Extended European Search Report and Opinion issued in connection with related EP Application No. 16176652.2 dated Nov. 28, 2016.

Extended European Search Report and Opinion issued in connection with related EP Application No. 16175556.6 dated Nov. 28, 2016.

Extended European Search Report and Opinion issued in connection with related EP Application No. 16176514.4 dated Dec. 2, 2016.

Non-Final Rejection towards related U.S. Appl. No. 14/753,073 dated Dec. 13, 2016.

U.S. Appl. No. 14/753,073 Office Action 1 dated Dec. 13, 2016, 16 pages.

U.S. Appl. No. 14/753,066, Office Action 1 dated Feb. 24, 2017, 33 pages.

U.S. Appl. No. 14/753,072, Office Action 1 dated Feb. 24, 2017, 34 pages.

U.S. Appl. No. 14/753,088, filed Jun. 29, 2015, Reed et al.

(56) References Cited

OTHER PUBLICATIONS

U.S. Appl. No. 14/753,066, filed Jun. 29, 2015, Davis et al.
U.S. Appl. No. 14/753,072, filed Jun. 29, 2015, Davis et al.
U.S. Appl. No. 14/753,073, filed Jun. 29, 2015, Kulkarni et al.
U.S. Appl. No. 14/753,074, filed Jun. 29, 2015, Kulkarni et al.
U.S. Appl. No. 14/753,077, filed Jun. 29, 2015, Reed et al.
U.S. Appl. No. 14/753,080, filed Jun. 29, 2015, Kulkarni et al.
U.S. Appl. No. 14/753,085, filed Jun. 29, 2015, Kulkarni et al.
U.S. Appl. No. 14/753,093, filed Jun. 29, 2015, Kulkarni et al.
U.S. Appl. No. 14/753,102, filed Jun. 29, 2015, Davis et al.
U.S. Appl. No. 14/753,107, filed Jun. 29, 2015, Kulkarni et al.
U.S. Appl. No. 14/753,097, filed Jun. 29, 2015, Davis et al.
U.S. Appl. No. 14/753,105, filed Jun. 29, 2015, Reed et al.
U.S. Appl. No. 14/753,088, Office Action 1 dated Jun. 28, 2017, 37 pages.
U.S. Appl. No. 141753,066, Notice of Allowance dated Jul. 13, 2017, 27 pages.
U.S. Appl. No. 14/753,072, Notice of Allowance dated Jul. 13, 2017, 28 pages.
U.S. Appl. No. 14/753,074, Office Action 1 dated Mar. 10, 2017, 41 pages.
U.S. Appl. No. 14/753,093, Office Action 1 dated Jun. 1, 2017, 40 pages.
U.S. Appl. No. 14/753,073, Final Office Action 1 dated Jun. 20, 2017, 28 pages.
U.S. Appl. No. 14/753,074, Notice of Allowance dated Sep. 18, 2017, 31 pages.
U.S. Appl. No. 14/753,097, Office Action 1 dated Oct. 11, 2017, 53 pages.
U.S. Appl. No. 14/753,077, Office Action 1 dated Oct. 13, 2017, 54 pages.
U.S. Appl. No. 14/753,107, Office Action 1 dated Oct. 20, 2017, 52 pages.
U.S. Appl. No. 14/753,085, Notice of Allowance dated Oct. 19, 2017, 47 pages.
U.S. Appl. No. 14/753,088, Final Office Action 1 dated Oct. 19, 2017, 32 pages.
U.S. Appl. No. 14/753,102, Office Action 1 dated Oct. 26, 2017, 53 pages.
U.S. Appl. No. 14/753,093, Final Office Action 1 dated Nov. 1, 2017, 30 pages.
U.S. Appl. No. 14/753,080, Notice of Allowance dated Nov. 3, 2017, 48 pages.

\* cited by examiner

POWER GENERATION SYSTEM EXHAUST COOLING

CROSS-REFERENCE TO RELATED APPLICATIONS

This application is related to co-pending U.S. application Nos.:
GE docket numbers 280685-1, application Ser. No. 14/753,066, 280687-1, application Ser. No. 14/753,072, 280688-1, application Ser. No. 14/753,073, 280692-1, application Ser. No. 14/753,074, 280707-1, application Ser. No. 14/753,077, 280714-1, application Ser. No. 14/753,080, 280730-1, application Ser. No. 14/753,085, 280731-1, application Ser. No. 14/753,088, 280815-1, application Ser. No. 14/753,093, 281003-1, application Ser. No. 14/753,102, 281004-1, application Ser. No. 14/753,107, 281005-1, application Ser. No. 14/753,097, and 281007-1, application Ser. No. 14/753,105, all filed on Jun. 29, 2015.

BACKGROUND OF THE INVENTION

The disclosure relates generally to power generation systems, and more particularly, to systems and methods for cooling the exhaust gas of power generation systems.

Exhaust gas from power generation systems, for example a simple cycle gas turbine power generation system, often must meet stringent regulatory requirements for the composition of the exhaust gas released into the atmosphere. One of the components typically found in the exhaust gas of a gas turbine power generation system and subject to regulation is nitrogen oxide (i.e., $NO_x$), which includes, for example, nitric oxide and nitrogen dioxide. To remove $NO_x$ from the exhaust gas stream, technology such as selective catalytic reduction (SCR) is often utilized. In an SCR process, ammonia ($NH_3$) or the like reacts with the $NO_x$ and produces nitrogen ($N_2$) and water ($H_2O$).

The effectiveness of the SCR process depends in part on the temperature of the exhaust gas that is processed. The temperature of the exhaust gas from a gas turbine power generation system is often higher than about 1100° F. However, SCR catalysts need to operate at less than about 900° F. to maintain effectiveness over a reasonable catalyst lifespan. To this extent, the exhaust gas from a simple cycle gas turbine power generation system is typically cooled prior to SCR.

Large external blower systems have been used to reduce the exhaust gas temperature of a gas turbine power generation system below 900° F. by mixing a cooling gas, such as ambient air, with the exhaust gas. Because of the possibility of catalyst damage due to a failure of an external blower system, a redundant external blower system is typically utilized. These external blower systems include many components, such as blowers, motors, filters, air intake structures, and large ducts, which are expensive, bulky, and add to the operating cost of a gas turbine power generation system. Additionally, the external blower systems and the operation of the gas turbine power generation system are not inherently coupled, thus increasing the probability of SCR catalyst damage due to excess temperature during various modes of gas turbine operation. To prevent SCR catalyst damage due to excess temperature (e.g., if the external blower system(s) fail or cannot sufficiently cool the exhaust gas), the gas turbine may need to be shut down until the temperature issue can be rectified.

BRIEF DESCRIPTION OF THE INVENTION

A first aspect of the disclosure provides a turbomachine system, including: a gas turbine system including a compressor component, a combustor component, and a turbine component; a mixing area for receiving an exhaust gas stream produced by the gas turbine system; a fluid injection system for injecting a fluid into the mixing area to reduce a temperature of the exhaust gas stream; and an exhaust processing system for processing the reduced temperature exhaust gas stream.

A second aspect of the disclosure provides a power generation system, including: a gas turbine system including a compressor component, a combustor component, and a turbine component; a mixing area for receiving an exhaust gas stream produced by the gas turbine system; a fluid injection system for injecting an atomized fluid into the mixing area to reduce a temperature of the exhaust gas stream; and an exhaust processing system for processing the reduced temperature exhaust gas stream, wherein the exhaust processing system comprises a carbon monoxide (CO) removal system and a selective catalytic reduction (SCR) system.

A third aspect of the disclosure provides a power generation system, including: a gas turbine system including a compressor component, a combustor component, and a turbine component; a shaft driven by the turbine component; an electrical generator coupled to the shaft for generating electricity; a mixing area for receiving an exhaust gas stream produced by the gas turbine system; a fluid injection system for injecting an atomized fluid into the mixing area to reduce a temperature of the exhaust gas stream; and an exhaust processing system for processing the reduced temperature exhaust gas stream, wherein the exhaust processing system comprises a carbon monoxide (CO) removal system and a selective catalytic reduction (SCR) system.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawing that depicts various embodiments of the disclosure.

It is noted that the drawing of the disclosure is not to scale. The drawing is intended to depict only typical aspects of the disclosure, and therefore should not be considered as limiting the scope of the disclosure. In the drawing, like numbering represents like elements between the drawings.

DETAILED DESCRIPTION OF THE INVENTION

As indicated above, the disclosure relates generally to power generation systems, and more particularly, to systems and methods for cooling the exhaust gas of power generation systems.

Figure 1:
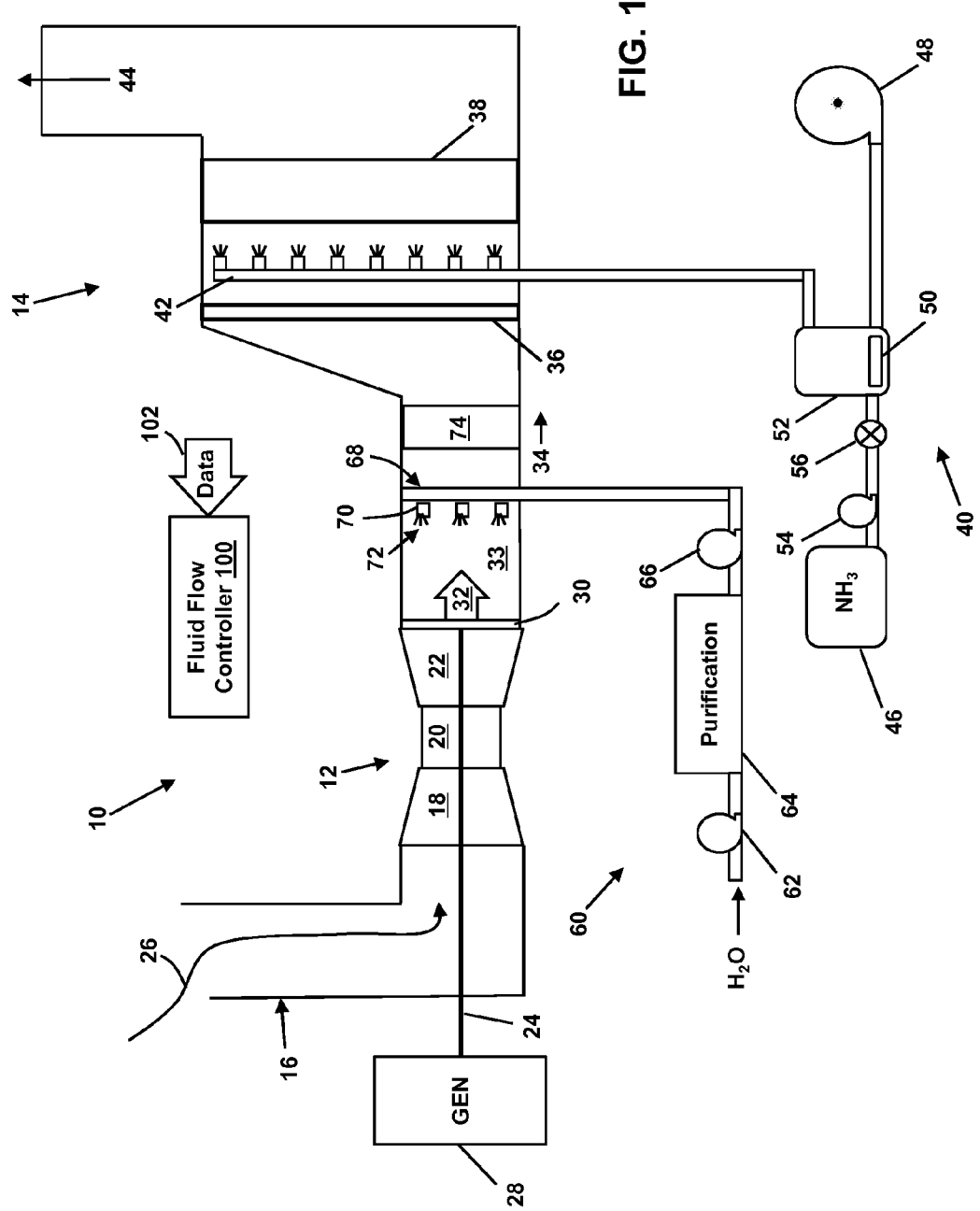
FIG. 1 depicts a schematic diagram of a simple cycle gas turbine power generation system according to embodiments.

FIG. 1 is a block diagram of a turbomachine system (e.g., a simple cycle gas turbine power generation system 10) that includes a gas turbine system 12 and an exhaust processing system 14. The gas turbine system 12 may combust liquid or gas fuel, such as natural gas and/or a hydrogen-rich synthetic gas, to generate hot combustion gases to drive the gas turbine system 12.

The gas turbine system 12 includes an air intake section 16, a compressor component 18, a combustor component 20, and a turbine component 22. The turbine component 22 is drivingly coupled to the compressor component 18 via a shaft 24. In operation, air (e.g., ambient air) enters the gas turbine system 12 through the air intake section 16 (indicated by arrow 26) and is pressurized in the compressor component 18. The compressor component 18 includes at least one stage including a plurality of compressor blades coupled to the shaft 24. Rotation of the shaft 24 causes a corresponding rotation of the compressor blades, thereby drawing air into the compressor component 18 via the air intake section 16 and compressing the air prior to entry into the combustor component 20.

The combustor component 20 may include one or more combustors. In embodiments, a plurality of combustors are disposed in the combustor component 20 at multiple circumferential positions in a generally circular or annular configuration about the shaft 24. As compressed air exits the compressor component 18 and enters the combustor component 20, the compressed air is mixed with fuel for combustion within the combustor(s). For example, the combustor(s) may include one or more fuel nozzles that are configured to inject a fuel-air mixture into the combustor(s) in a suitable ratio for combustion, emissions control, fuel consumption, power output, and so forth. Combustion of the fuel-air mixture generates hot pressurized exhaust gases, which may then be utilized to drive one or more turbine stages (each having a plurality of turbine blades) within the turbine component 22.

In operation, the combustion gases flowing into and through the turbine component 22 flow against and between the turbine blades, thereby driving the turbine blades and, thus, the shaft 24 into rotation. In the turbine component 22, the energy of the combustion gases is converted into work, some of which is used to drive the compressor component 18 through the rotating shaft 24, with the remainder available for useful work to drive a load such as, but not limited to, an electrical generator 28 for producing electricity, and/or another turbine.

The combustion gases that flow through the turbine component 22 exit the downstream end of the turbine component 22 through an exhaust diffuser 30 as a stream of exhaust gas 32. The exhaust gas stream 32 may continue to flow in a downstream direction 34 towards the exhaust processing system 14. The turbine component 22 may be fluidly coupled via a mixing area 33 to a CO removal system (including, e.g., a CO catalyst 36) and an SCR system (including, e.g., an SCR catalyst 38) of the exhaust processing system 14. As discussed above, as a result of the combustion process, the exhaust gas stream 32 may include certain byproducts, such as nitrogen oxides ($NO_x$), sulfur oxides ($SO_x$), carbon oxides ($CO_x$), and unburned hydrocarbons. Due to certain regulatory requirements, an exhaust processing system 14 may be employed to reduce or substantially minimize the concentration of such byproducts prior to atmospheric release.

One technique for removing or reducing the amount of $NO_x$ in the exhaust gas stream 32 is by using a selective catalytic reduction (SCR) process. For example, in an SCR process for removing $NO_x$ from the exhaust gas stream 32, ammonia ($NH_3$) or other suitable reductant may be injected into the exhaust gas stream 32. The ammonia reacts with the $NO_x$ to produce nitrogen ($N_2$) and water ($H_2O$).

As shown in FIG. 1, an ammonia evaporator system 40 and an ammonia injection grid 42 may be used to vaporize and inject an ammonia solution (e.g., stored in a tank 46) into the exhaust gas stream 32 upstream of the SCR catalyst 38. The ammonia injection grid 42 may include, for example, a network of pipes with openings/nozzles for injecting vaporized ammonia into the exhaust gas stream 32. As will be appreciated, the ammonia and $NO_x$ in the exhaust gas stream 32 react as they pass through the SCR catalyst 38 to produce nitrogen ($N_2$) and water ($H_2O$), thus removing $NO_x$ from the exhaust gas stream 32. The resulting emissions may be released into the atmosphere through a stack 44 of the gas turbine system 12.

The ammonia evaporator system 40 may further include, for example, a blower system 48, one or more heaters 50 (e.g., electric heaters), and an ammonia vaporizer 52, for providing vaporized ammonia that is injected into the exhaust gas stream 32 via the ammonia injection grid 42. The ammonia may be pumped from the tank 46 to the ammonia vaporizer 52 using a pump system 54. The blower system 48 may include redundant blowers, while the pump system 54 may include redundant pumps to ensure continued operation of the ammonia evaporator system 40 in case of individual blower/pump failure.

The effectiveness of the SCR process depends in part on the temperature of the exhaust gas stream 32 that is processed. The temperature of the exhaust gas stream 32 generated by the gas turbine system 12 is often higher than about 1100° F. However, the SCR catalyst 38 typically needs to operate at temperatures less than about 900° F.

According to embodiments, a fluid injection system 60 may be used to inject a cooling fluid (e.g., water) into the exhaust gas stream 32 to decrease the temperature of the exhaust gas stream 32 to a level suitable for the SCR catalyst 38. As depicted in FIG. 1, the fluid injection system 60 may be configured to inject water ($H_2O$) into the exhaust gas stream 32. A first pump 62 may be used to deliver a supply of water to a water purification system 64. After purification, the water may be directed by a second pump 66 to a fluid injector 68. Although the cooling fluid detailed herein is water, other suitable fluids may also be used in any of the embodiments disclosed herein.

The fluid injector 68 may include a plurality of nozzles 70 for atomizing the water and for directing the atomized water 72 into the exhaust gas stream 32. As depicted in FIG. 1, the nozzles 70 of the fluid injector 68 may be directed upstream toward the exhaust diffuser 30 of the turbine component 22 of the gas turbine system 12 to enhance mixing within the mixing area 33. In other embodiments, the nozzles 70 of the fluid injector 68 may be directed in a downstream direction 34 (e.g., in the same direction as the exhaust gas stream 32) or in both an upstream and downstream direction. In any case, the nozzles 70 of the fluid injector 68 may be arranged to provide proper mixing and temperature uniformity in the mixing area 33. For example, the nozzles 70 of the fluid injector 68 may be arranged in a uniformly arranged grid format.

In the mixing area 33, the atomized water 72 mixes with and cools the exhaust gas stream 32 to a temperature suitable for use with the SCR catalyst 38. The temperature of the exhaust gas stream 32 generated by the gas turbine system 12 is cooled by the atomized water 72 from about 1100° F. to less than about 900° F. in the mixing area 33. A fluid flow controller 100 may be provided to control the amount of water that is injected into the exhaust gas stream 32 to maintain the temperature at the SCR catalyst 38 at an appropriate level (e.g., 900° F.).

A supplemental mixing system 74 (FIG. 1) may be positioned within the mixing area 33 to enhance the mixing process. The supplemental mixing system 74 may comprise, for example, a static mixer, baffles, and/or the like. The CO catalyst 36 may also help to improve the mixing process by adding back pressure (e.g., directed back toward the turbine component 22).

Figure 6:
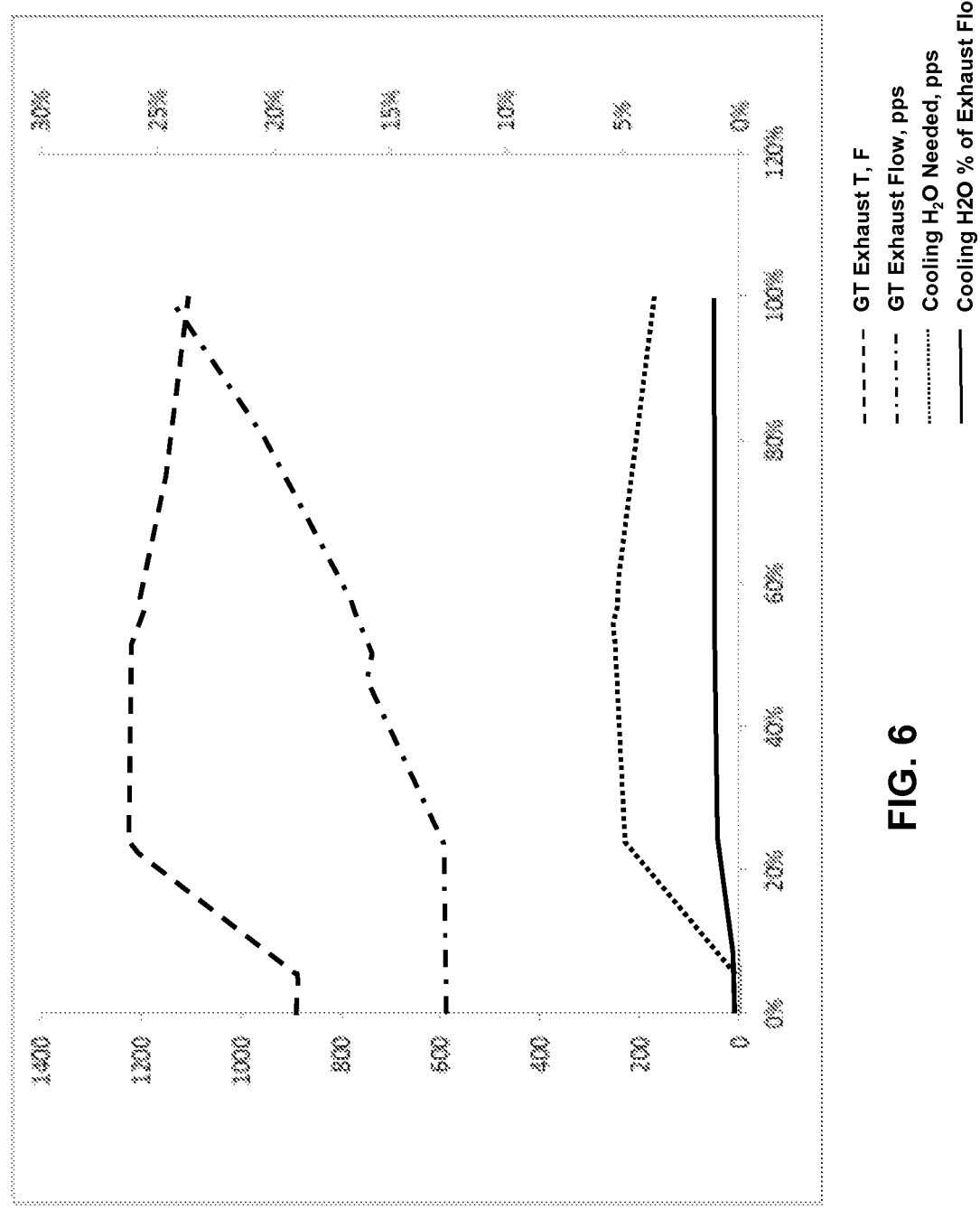
FIG. 6 is a chart showing an illustrative relationship between the flow of water and the temperature of an exhaust gas stream at different load percentages of a gas turbine system, according to embodiments.

FIG. 6 depicts a chart showing an illustrative relationship between the temperature of the exhaust gas stream 32 of the gas turbine system 12 and the flow of atomized water 72 into the mixing area 33 needed to maintain the temperature at the SCR catalyst 38 at a suitable level (e.g., 900° F.) at different load percentages of the gas turbine system 12. As represented in the chart in FIG. 6, the amount of atomized water 72 injected into the exhaust gas stream 32 via the fluid injector 68 may be varied (e.g., under control of the fluid flow controller 100) as the temperature of the exhaust gas stream 32 changes, in order to maintain the temperature at the SCR catalyst 38 at the correct level. In this example, the flow of atomized water 72 needed at a 100% load percentage of the gas turbine system 12 is less than about 5% of the flow of the exhaust gas stream 32.

Figure 2:
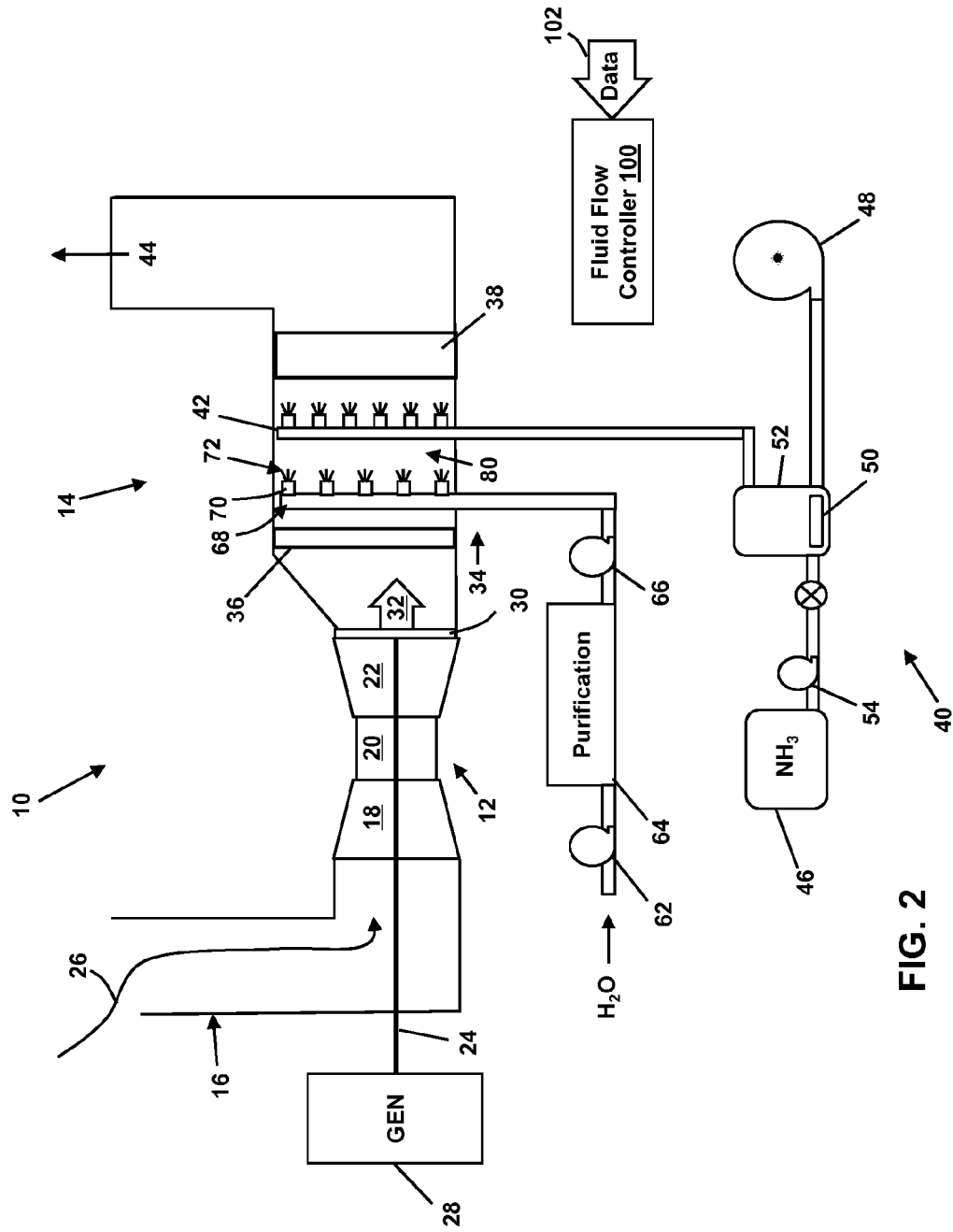
FIG. 2 depicts a schematic diagram of a simple cycle gas turbine power generation system according to embodiments.

In other embodiments, as depicted for example in FIG. 2, the CO catalyst 36 may be operated at a higher temperature (e.g., from about 1000° F. to about 1200° F.). In this case, the exhaust gas stream 32 produced by the gas turbine system 12 is directed toward and flows through the CO catalyst 36 before any cooling action is performed.

In FIG. 2, mixing of the atomized water 72 and the exhaust gas stream 32 occurs in a mixing area 80 disposed between the CO catalyst 36 and the ammonia injection grid 42. In this case, atomized water 72 may be injected by the fluid injection system 60 into the exhaust gas stream 32 downstream of the CO catalyst 36 and upstream of the ammonia injection grid 42 and the SCR catalyst 38.

As previously described, a first pump 62 may be used to deliver a supply of water to a water purification system 64. After purification, the water may be directed by a second pump 66 to a fluid injector 68. The fluid injector 68 may include a plurality of nozzles 70 for atomizing the water and for directing the atomized water 72 into the exhaust gas stream 32. As depicted in FIG. 2, the nozzles 70 of the fluid injector 68 may be directed downstream toward the ammonia injection grid 42. In other embodiments, the nozzles 70 of the fluid injector 68 may be directed in an upstream direction (e.g., toward the exhaust gas stream 32). In either case, the nozzles 70 of the fluid injector 68 may be arranged to provide proper mixing and temperature uniformity in the mixing area 80.

In the mixing area 80, the atomized water 72 mixes with and cools the exhaust gas stream 32. In embodiments, the temperature of the exhaust gas stream 32 generated by the gas turbine system 12 may be cooled by the atomized water 72 from about 1100° F. to less than about 900° F. in the mixing area 80. A fluid flow controller 100 may be provided to control the amount of atomized water 72 that is injected into the exhaust gas stream 32 to maintain the temperature at the SCR catalyst 38 at an acceptable level (e.g., 900° F.). Vaporized ammonia may then be injected into the exhaust gas stream 32 via the ammonia injection grid 42 before the exhaust gas stream 32 interacts with the SCR catalyst 38.

Figure 3:
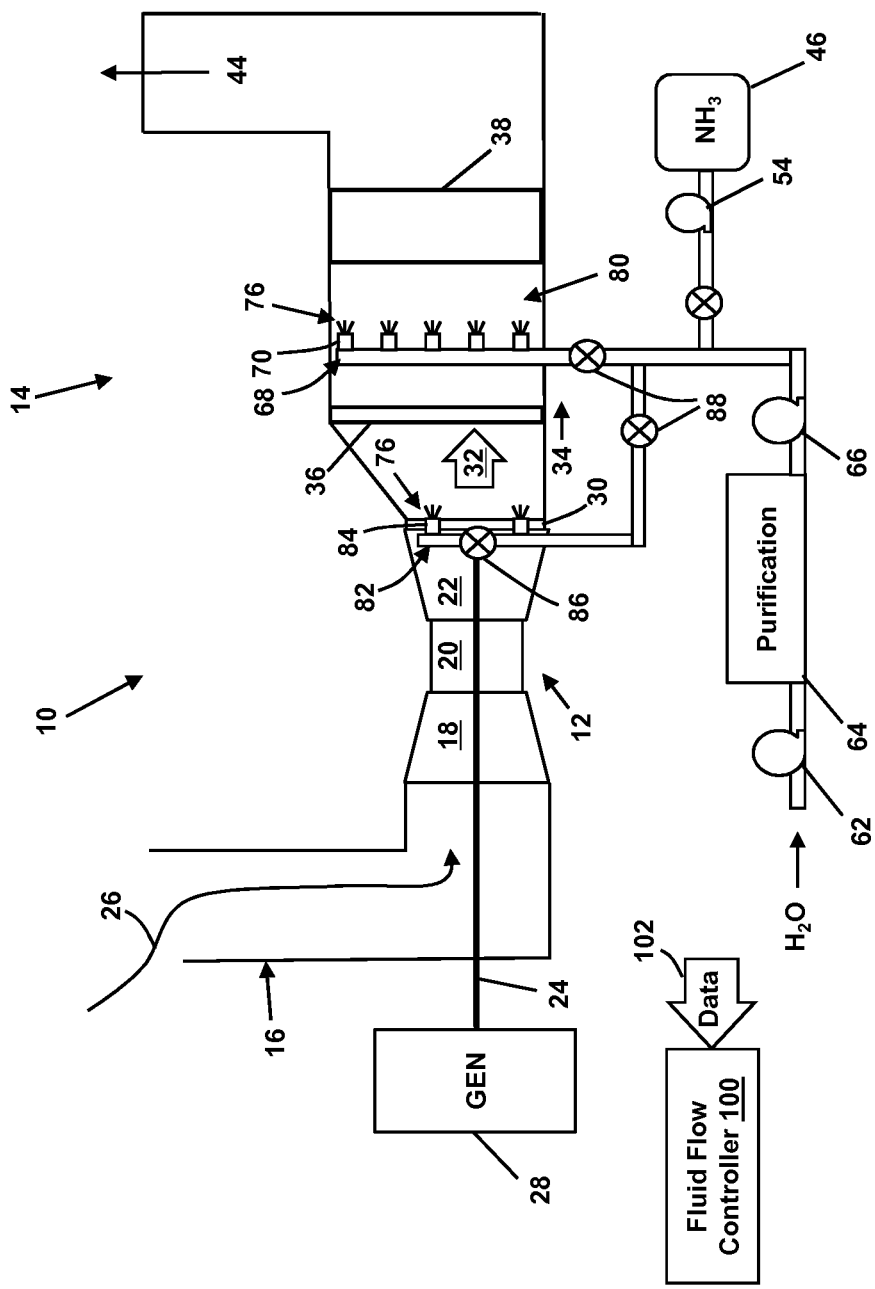
FIG. 3 depicts a schematic diagram of a simple cycle gas turbine power generation system according to embodiments.

FIG. 3 depicts an embodiment similar to that shown in FIG. 2, except that ammonia is added directly to the purified cooling water being pumped to the fluid injector 68. This eliminates the need for a separate ammonia evaporator system 40 and ammonia injection grid 42.

The water/ammonia solution is atomized by the nozzles 70 of the fluid injector 68 to provide a supply of atomized water/ammonia 76. The atomized water/ammonia 76 is directed into the exhaust gas stream 32. In the mixing area 80, the atomized water/ammonia 76 mixes with and cools the exhaust gas stream 32. In embodiments, the temperature of the exhaust gas stream 32 generated by the gas turbine system 12 may be cooled by the atomized water/ammonia 76 from about 1100° F. to less than about 900° F. in the mixing area 80. A fluid flow controller 100 may be provided to control the amount of atomized water/ammonia 76 that is injected into the exhaust gas stream 32 to maintain the temperature at the SCR catalyst 38 at an acceptable level (e.g., 900° F.).

An additional fluid injector 82 may be provided to inject a supply of the water/ammonia solution into the exhaust gas stream 32 as it exits the exhaust diffuser 30. The fluid injector 82 may include a plurality of nozzles 84 for atomizing and directing atomized water/ammonia 76 into the exhaust gas stream 32. At least one valve 86 may be provided to selectively provide the water/ammonia solution to different sets of the nozzles 84 of the fluid injector 82 to provide temperature and ammonia uniformity at the SCR catalyst 38 (e.g., to extend the life of the SCR catalyst 38 and to reduce ammonia slip in the SCR catalyst 38). Valves 88 may be provided to selectively control the flow of the water/ammonia solution to the fluid injectors 68, 82.

Figure 4:
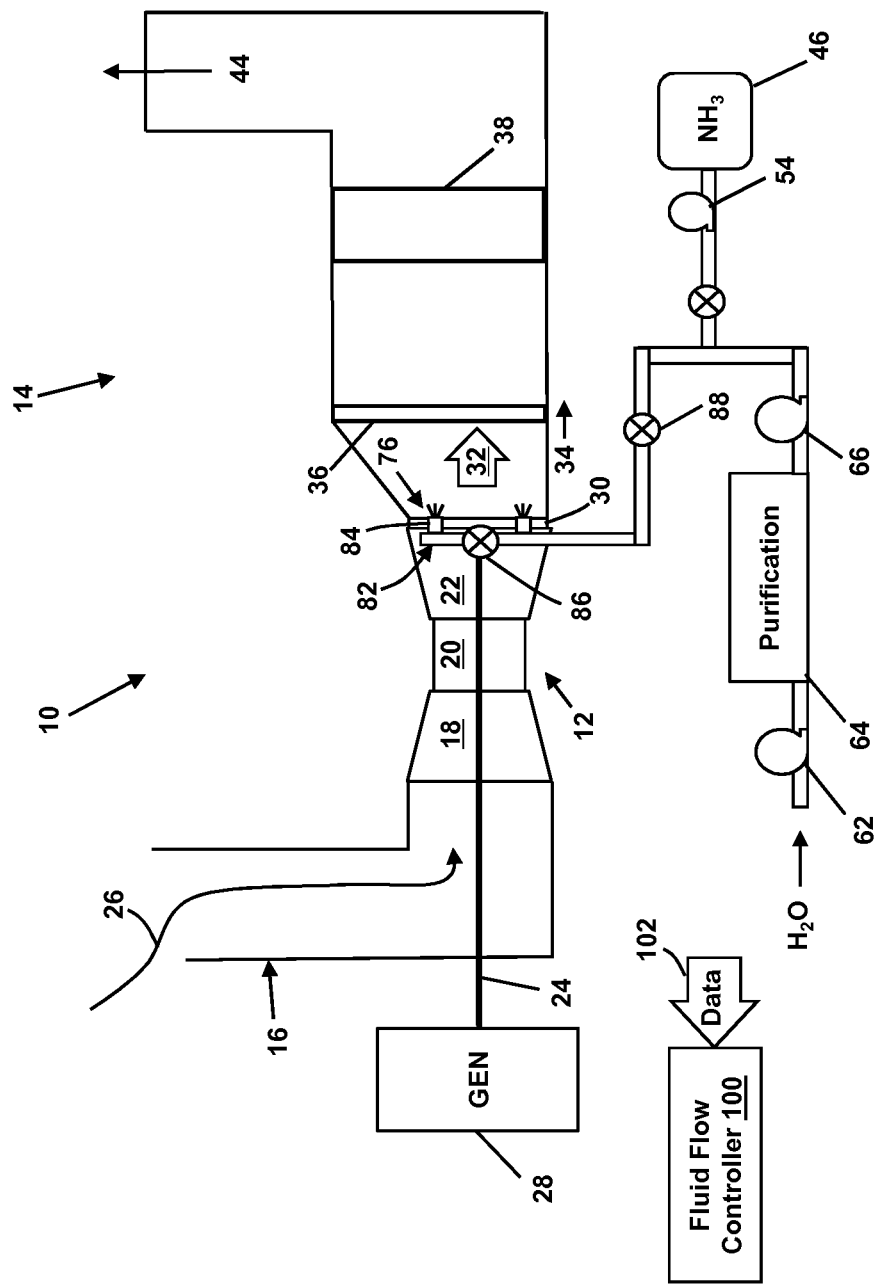
FIG. 4 depicts a schematic diagram of a simple cycle gas turbine power generation system according to embodiments.

According to embodiments, the fluid injector 68 may be eliminated. In this case, as depicted in FIG. 4, the fluid injector 82 may be used to inject a supply of the water/ammonia solution into the exhaust gas stream 32 as it exits the exhaust diffuser 30.

Figure 5:
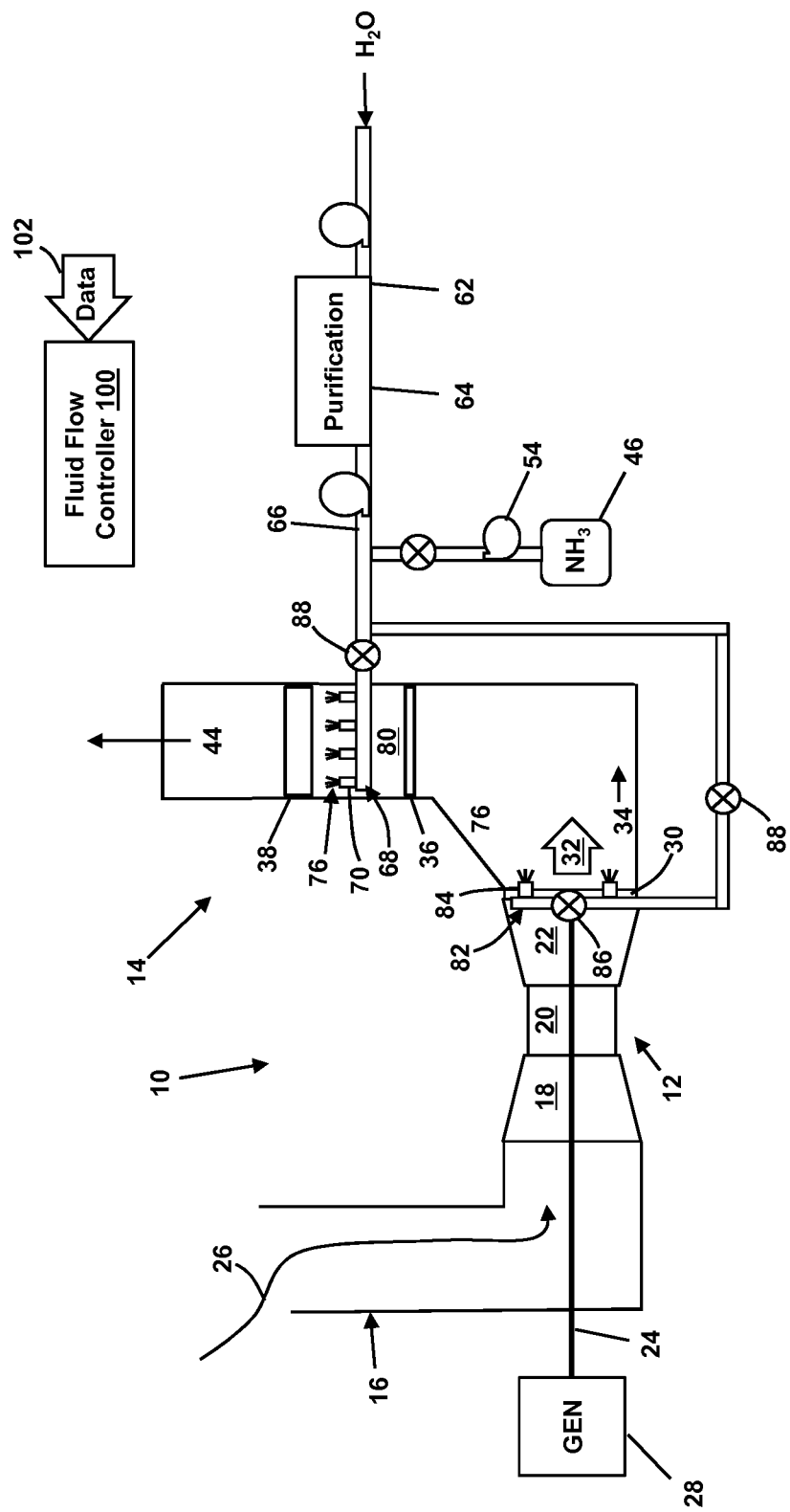
FIG. 5 depicts a schematic diagram of a simple cycle gas turbine power generation system according to embodiments.

In embodiments, as shown for example in FIG. 5, the CO catalyst 36 and SCR catalyst 38 may be disposed within the stack 44 of the gas turbine power generation system 10. This may greatly reduce the overall footprint of the gas turbine power generation system 10. Similar to the embodiment shown in FIG. 3, atomized water/ammonia 76 may be directed into the exhaust gas stream 32 via the nozzles 70 of the fluid injector 68.

A mixing area 80 in this case is located within the stack 44 between the CO catalyst 36 and the SCR catalyst 38. In the mixing area 80, the atomized water/ammonia 76 mixes with and cools the exhaust gas stream 32. In embodiments, the temperature of the exhaust gas stream 32 generated by the gas turbine system 12 may be cooled by the atomized water/ammonia 76 from about 1100° F. to less than about 900° F. in the mixing area 80. A fluid flow controller 100 may be provided to control the amount of atomized water/ammonia 76 that is injected into the exhaust gas stream 32 to maintain the temperature at the SCR catalyst 38 at an acceptable level (e.g., 900° F.).

An additional fluid injector 82 may be provided to inject a supply of the water/ammonia solution into the exhaust gas stream 32 as it exits the exhaust diffuser 30. The fluid injector 82 may include a plurality of nozzles 84 for atomizing and directing atomized water/ammonia 76 into the exhaust gas stream 32. At least one valve 86 may be provided to selectively provide the water/ammonia solution to different sets of the nozzles 84 of the fluid injector 82 to provide temperature and ammonia uniformity at the SCR catalyst 38 (e.g., to extend the life of the SCR catalyst 38 and to reduce ammonia slip in the SCR catalyst 38). Valves 88 may be provided to selectively control the flow of the water/ammonia solution to the fluid injectors 68, 82.

According to embodiments, the fluid injector 68 may be eliminated. In this case, similar to the embodiment shown in FIG. 4, the fluid injector 82 may be used to inject a supply of the water/ammonia solution into the exhaust gas stream 32 as it exits the exhaust diffuser 30.

The fluid flow controller 100 may be used to regulate the amount of atomized water 72 or atomized water/ammonia 76 that is needed to cool the exhaust gas stream 32 under varying operating conditions. The fluid flow controller 100 may receive data 102 associated with the operation of the gas turbine power generation system 10. Such data may include, for example, the temperature of the exhaust gas stream 32 as it enters the mixing area 33 and/or mixing area 80, the temperature of the exhaust gas stream 32 at the SCR catalyst 38 after mixing/cooling has occurred in the mixing area 33 and/or mixing area 80, the temperature of the air drawn into the air intake section 16 by the compressor component 18 of the gas turbine system 12, the temperature of the water and/or water/ammonia solution, and other temperature data obtained at various locations within the gas turbine power generation system 10. The data 102 may further include airflow and pressure data obtained, for example, within the air intake section 16, at the entrance of the compressor component 18, and at various other locations within the gas turbine power generation system 10. Load data, fuel consumption data, and other information associated with the operation of the gas turbine system 12 may also be provided to the fluid flow controller 100. The fluid flow controller 100 may further receive status or operational information associated with various pumps, valves, and/or other components of the gas turbine system 12, etc. It should be readily apparent to those skilled in the art how such data may be obtained (e.g., using appropriate sensors, feedback data, etc.), and further details regarding the obtaining of such data will not be provided herein.

Based on the received data 102, the fluid flow controller 100 is configured to vary as needed the amount of atomized water 72 and/or atomized water/ammonia 76 injected into the mixing area 33 and/or mixing area 80 for cooling the exhaust gas stream 32. This may be achieved, for example, by controlling the amount of water or water/ammonia solution provided (e.g., pumped) to the fluid injector(s) 68, 82.

The fluid flow controller 100 may include a computer system having at least one processor that executes program code configured to control the amount of atomized water 72 and/or atomized water/ammonia 76 injected into the mixing area 33 and/or mixing area 80 using, for example, data 102 and/or instructions from human operators. The commands generated by the fluid flow controller 100 may also be used to control the operation of various components in the gas turbine power generation system 10.

The use of a fluid based system for cooling the exhaust gas stream 32 of the gas turbine system 12 in lieu of conventional large external blower systems and/or other conventional cooling structures provides many advantages. For example, the need for redundant external blower systems and associated components (e.g., blowers, motors and associated air intake structures, filters, ducts, etc.) is eliminated. This reduces manufacturing and operating costs, as well as the overall footprint, of the gas turbine power generation system 10. The footprint of the gas turbine power generation system 10 may further be reduced by positioning the CO catalyst 36 and SCR catalyst 38 in the stack 44 of the gas turbine system 12 as depicted in FIG. 4.

Power requirements of the gas turbine power generation system 10 are reduced because it generally takes much less energy to pump water compared to moving/pressurizing air. The embodiments disclosed herein eliminate the need for large blower motors commonly used in conventional external blower cooling systems. Further cost/energy savings are achieved by combining ammonia with water as in the embodiments shown in FIGS. 3-5. This eliminates the need for various components (e.g., blower system 48, heater(s) 50, ammonia vaporizer 52) of the ammonia evaporator system 40.

In various embodiments, components described as being "coupled" to one another can be joined along one or more interfaces. In some embodiments, these interfaces can include junctions between distinct components, and in other cases, these interfaces can include a solidly and/or integrally formed interconnection. That is, in some cases, components that are "coupled" to one another can be simultaneously formed to define a single continuous member. However, in other embodiments, these coupled components can be formed as separate members and be subsequently joined through known processes (e.g., fastening, ultrasonic welding, bonding).

When an element or layer is referred to as being "on", "engaged to", "connected to" or "coupled to" another element, it may be directly on, engaged, connected or coupled to the other element, or intervening elements may be present. In contrast, when an element is referred to as being "directly on," "directly engaged to", "directly connected to" or "directly coupled to" another element, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:
1. A power generation system, comprising:
   a gas turbine system including a compressor component, a combustor component, and a turbine component;
   a mixing area for receiving an exhaust gas stream produced by the gas turbine system;

a first fluid injection system for injecting a first atomized fluid into the mixing area to reduce a temperature of the exhaust gas stream, the first atomized fluid including water;

an exhaust processing system for processing the reduced temperature exhaust gas stream, wherein the exhaust processing system comprises a carbon monoxide (CO) removal system and a selective catalytic reduction (SCR) system, wherein the first fluid injection system injects the first atomized fluid into the mixing area and toward an exit of the turbine component upstream of the CO removal system and the SCR system of the exhaust processing system; and a second fluid injection system for injecting a second atomized fluid into the exhaust gas stream, wherein the second fluid injection system injects the second atomized fluid between the carbon monoxide removal system and the selective catalytic reduction system of the exhaust processing system in a downstream direction, the second atomized fluid including ammonia.

2. The power generation system of claim 1, wherein the mixing area is disposed upstream of the exhaust processing system.

3. The power generation system of claim 1, wherein the mixing area is disposed adjacent a downstream end of the turbine component.

4. A power generation system, comprising:
a gas turbine system including a compressor component, a combustor component, and a turbine component;
a shaft driven by the turbine component;
an electrical generator coupled to the shaft for generating electricity;
a mixing area for receiving an exhaust gas stream produced by the gas turbine system;
a first fluid injection system for injecting a first atomized fluid into the mixing area to reduce a temperature of the exhaust gas stream, the first atomized fluid including water;
an exhaust processing system for processing the reduced temperature exhaust gas stream, wherein the exhaust processing system comprises a carbon monoxide (CO) removal system and a selective catalytic reduction (SCR) system,
wherein the first fluid injection system injects the first atomized fluid into the mixing area and toward an exit of the turbine component upstream of the CO removal system and the SCR system of the exhaust processing system; and
a second fluid injection system for injecting a second atomized fluid into the exhaust gas stream,
wherein the second fluid injection system injects the second atomized fluid between the carbon monoxide removal system and the selective catalytic reduction system of the exhaust processing system in a downstream direction, the second atomized fluid including ammonia.

5. The power generation system of claim 4, wherein the mixing area is disposed upstream of the exhaust processing system adjacent a downstream end of the turbine component.

* * * * *